July 18, 1967 — M. MERZ — 3,331,407
SAW CHAIN DEBURRING STRUCTURE
Filed Oct. 13, 1965 — 4 Sheets-Sheet 1
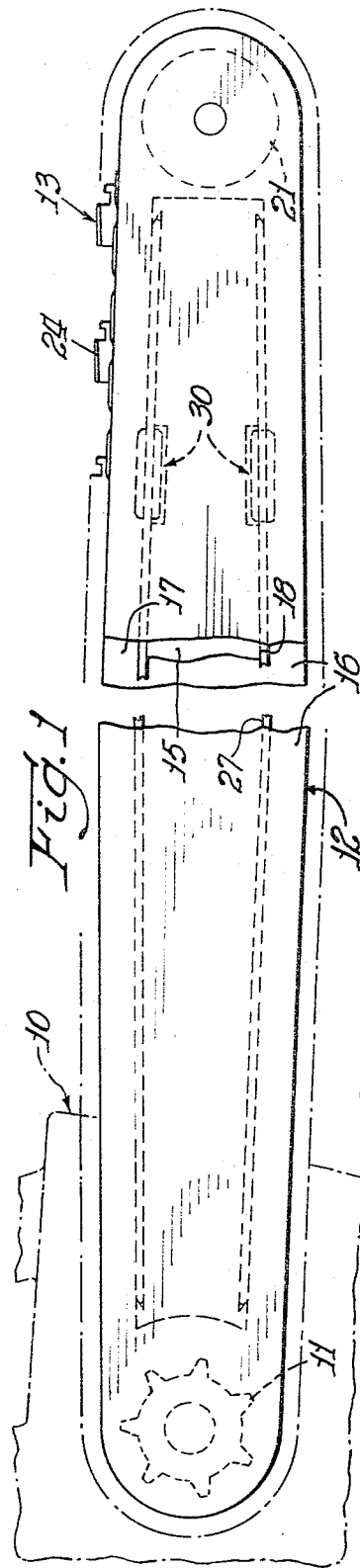
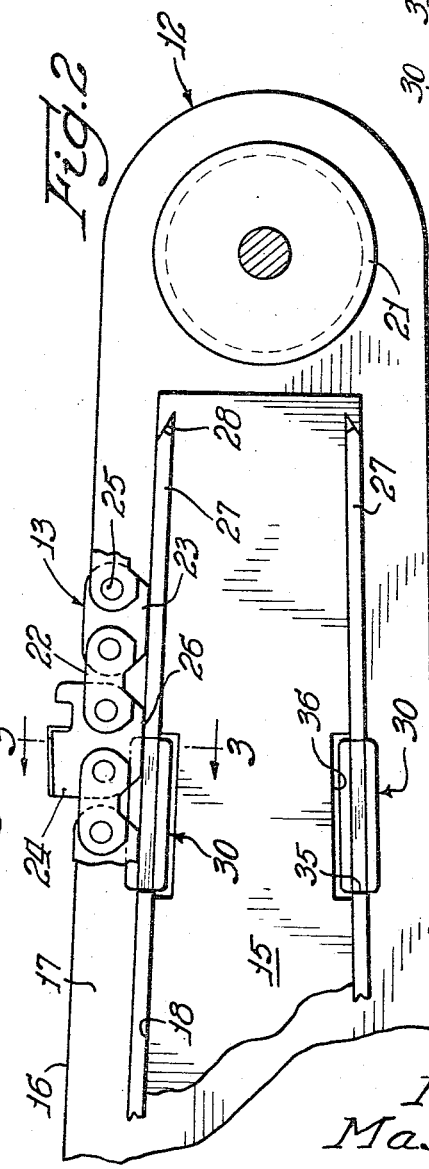
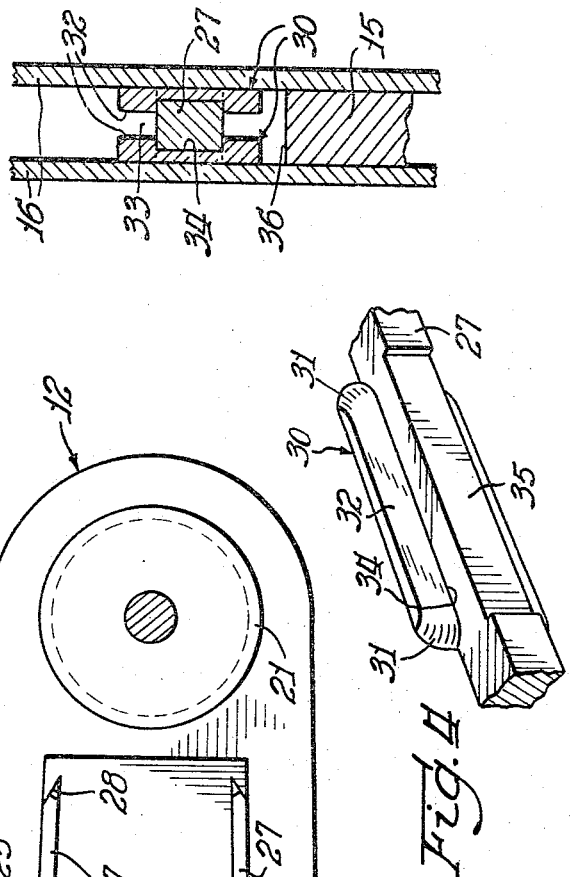
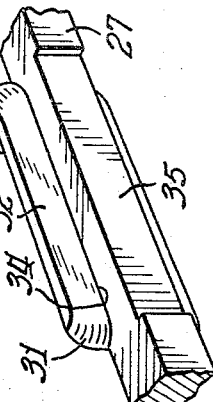
Inventor:
Max Merz
By: Evan D. Roberts, Atty.

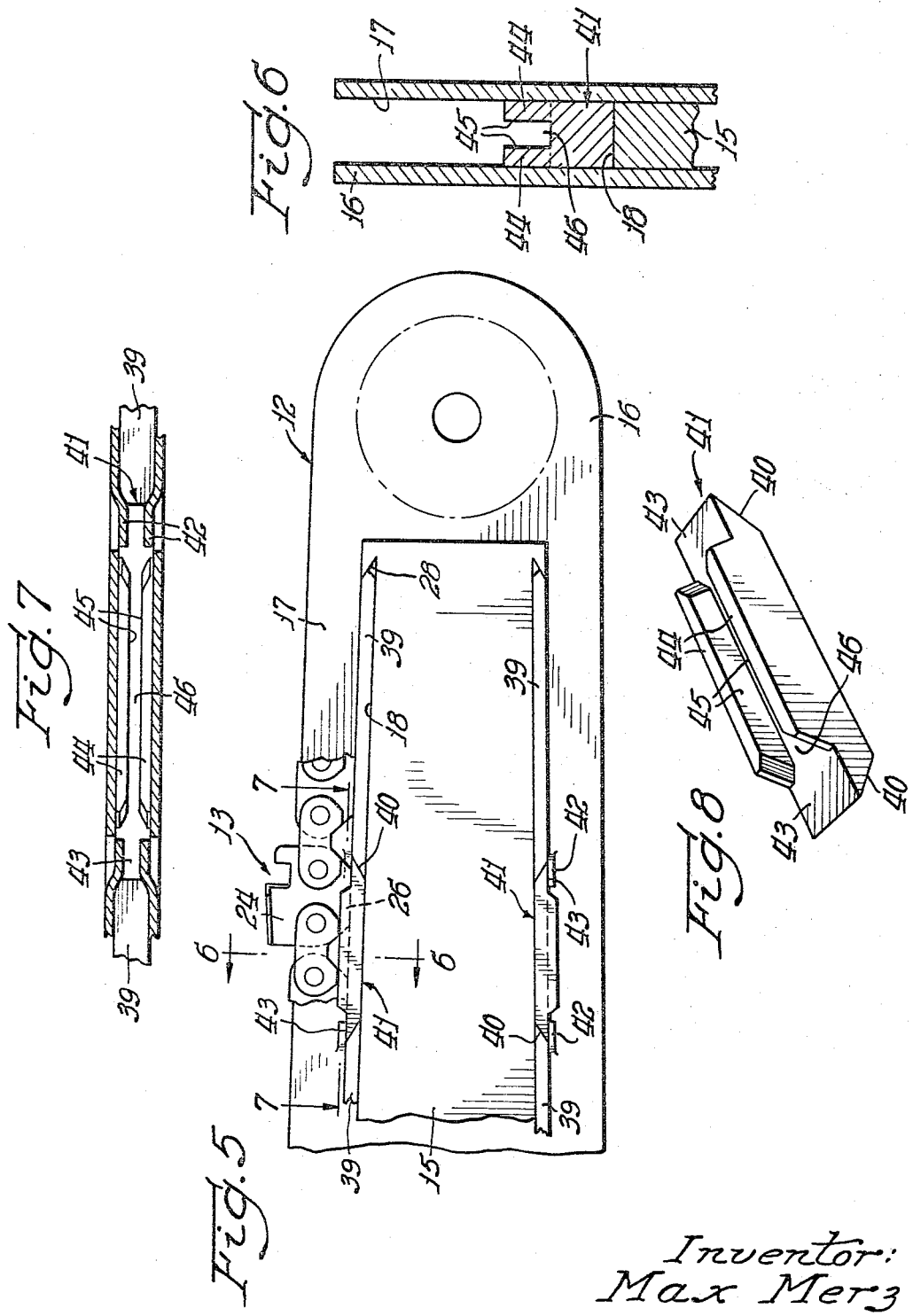

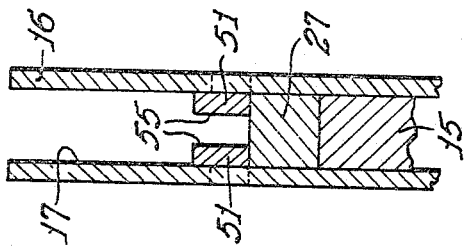
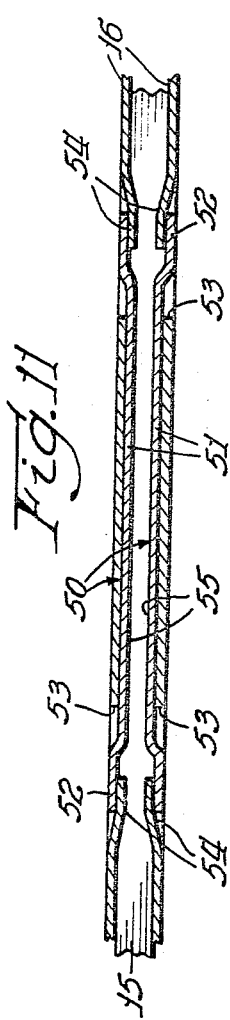
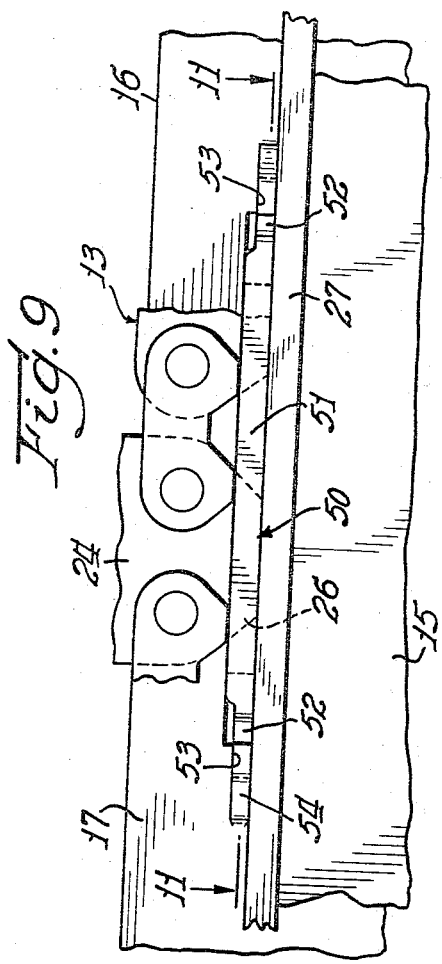

July 18, 1967 M. MERZ 3,331,407
SAW CHAIN DEBURRING STRUCTURE
Filed Oct. 13, 1965 4 Sheets-Sheet 4
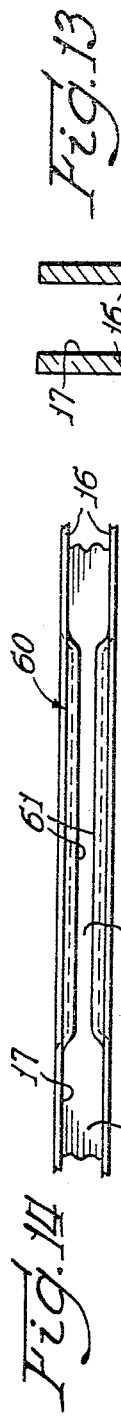
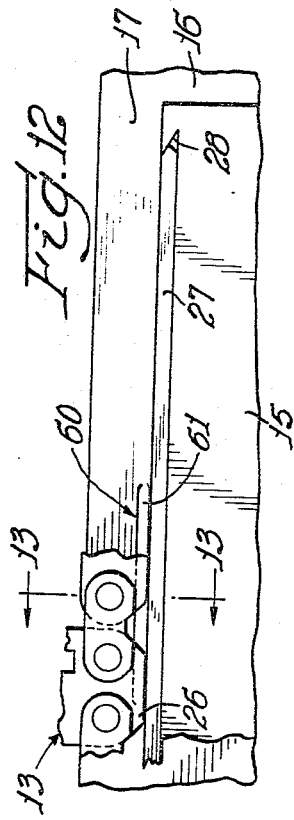
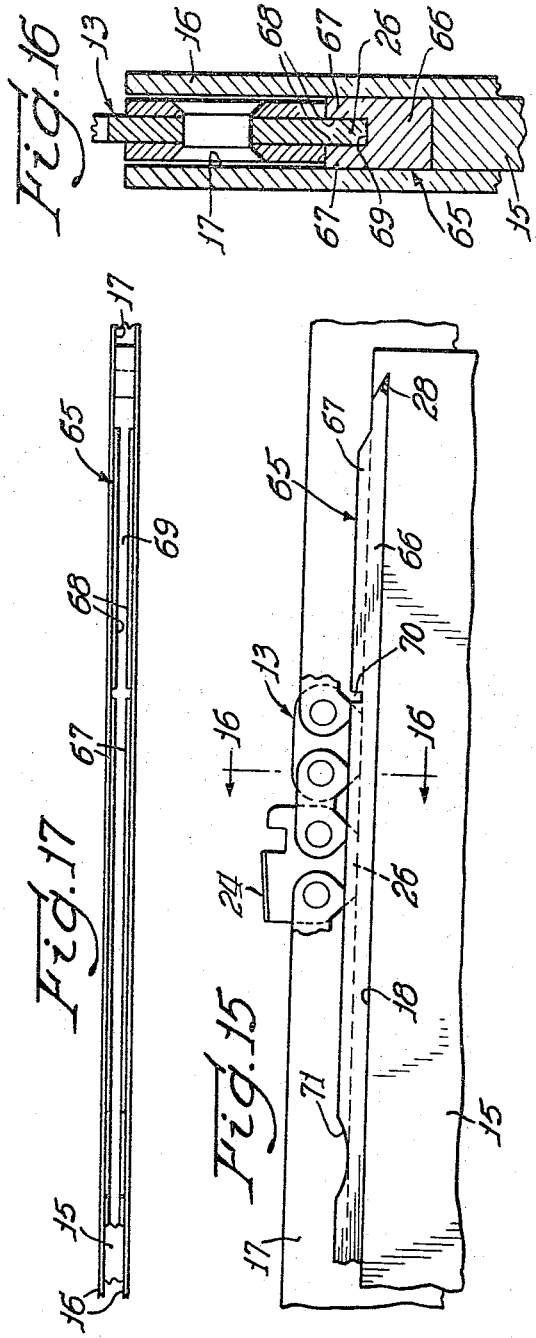
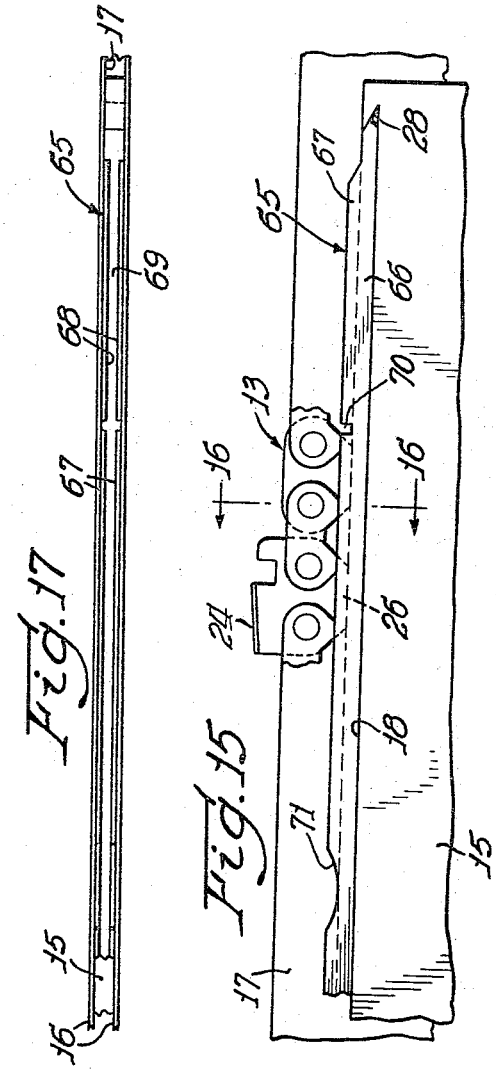
Inventor:
Max Merz
By: Evan D. Roberts Atty.

United States Patent Office 3,331,407
Patented July 18, 1967

3,331,407
SAW CHAIN DEBURRING STRUCTURE
Max Merz, Los Angeles, Calif., assignor, by mesne assignments, to Nicholson File Company, Providence, R.I., a corporation of Rhode Island
Filed Oct. 13, 1965, Ser. No. 495,472
9 Claims. (Cl. 143—32)

This invention relates to a saw chain deburring structure, and in particular, to a structure provided in conjunction with a chain saw bar for automatically deburring a saw chain used with the bar.

When a chain saw is operated, the saw chain thereof is driven along a groove in the periphery of a chain saw bar by a chain driving sprocket. As the sprocket engages the projecting teeth of the chain, and as the chain is caused to engage the bottom of the groove during its travel around the bar, the sprocket and bar engaging portions of the chain will be deformed along the engaging edges therof causing upset portions or burrs to form thereon. As the chain is used, the burrs will become increasingly larger, and will interfere with the articulation of the chain as it passes around the nose of the bar on the drive sprocket. This articulation interference causes additional wear on the pintles which interconnect the chain links and on the chain links themselves, and thus causes excessive additional friction and a shortening of the chain life.

It is, therefore, highly desirable to provide a deburring structure which could be used in conjunction with the chain saw bar to continuously and automatically maintain the chain free of burrs during the use thereof to prevent the build-up of burrs on the chain resulting from the deforming forces applied thereto during use. The chain would thus be maintained in a condition to more freely articulate in use and to prevent excessive resistance to stress and strain on the inter-related elements thereof.

A primary object of this invention is, therefore, to provide a saw chain deburring structure to be used in conjunction with a chain saw bar for automatically and continuously maintaining the saw chain substantially free of burrs during the use thereof.

Another object of this invention is to provide an improved saw chain deburring structure which is relatively simple and economical to manufacture, use and maintain.

With these and other objects in view, the present invention provides a saw chain deburring structure, wherein the saw chain bar is provided with a groove to receive a saw chain which is adapted to be driven in said groove and which has aligned links extending further into said groove than the remaining links, and wherein an abrasive means is provided in the bar groove to slidably engage the sides of the projecting aligned links to maintain the projecting portions thereof substantially tapered to prevent the undesirable reactions between the articulately interrelated elements of the saw chain.

Other objects, advantages and novel aspects of the invention will become apparent upon consideration of the following detailed description, in conjunction with the accompanying drawings wherein:

FIG. 1 is a general view of a chain saw;

FIG. 2 is a partial side view of a chain saw bar showing the deburring structure of the first embodiment of this invention;

FIG. 3 is a partial sectional view taken along line 3—3 of FIG. 2 showing the position of the deburring structure of the first embodiment of this invention in the groove of the bar;

FIG. 4 is a perspective view of the deburring structure of the first embodiment of this invention;

FIG. 5 is a partial side view of a chain saw bar showing the deburring structure of the second embodiment of this invention;

FIG. 6 is a partial sectional view taken along line 6—6 of FIG. 5 showing the position of the deburring structure of the second embodiment of this invention in the groove of the bar;

FIG. 7 is a sectional view taken along line 7—7 of FIG. 5 showing the position of the deburring structure of the second embodiment of this invention;

FIG. 8 is a perspective view of the deburring structure of the second embodiment of this invention;

FIG. 9 is a partial side view of a chain saw bar showing the deburring structure of the third embodiment of this invention;

FIG. 10 is a partial sectional view taken laterally through the bar showing the position of the deburring structure of the third embodiment of this invention in the groove of the bar;

FIG. 11 is a sectional view taken along line 11—11 of FIG. 9 showing the position of the deburring structure of the third embodiment of this invention;

FIG. 12 is a partial side view of a chain saw bar showing the deburring structure of the fourth embodiment of this invention;

FIG. 13 is a partial sectional view taken along line 13—13 of FIG. 12 showing the position of the deburring structure of the fourth embodiment of this invention in the groove of the bar;

FIG. 14 is a partial top edge view of the chain saw bar showing the position of the deburring structure of the fourth embodiment of this invention;

FIG. 15 is a partial side view of a chain saw bar showing the deburring structure of the fifth embodiment of this invention;

FIG. 16 is a partial sectional view taken along line 16—16 of FIG. 15 showing the position of the deburring structure of the fifth embodiment of this invention in the groove of the bar; and FIG. 17 is a partial top edge view of the chain saw bar showing the position of the deburring structure of the fifth embodiment of this invention.

Referring to the drawings, the first embodiment of the invention is illustrated (FIGS. 2–4), in conjunction with a chain saw (FIG. 1). The chain saw is generally provided with a drive unit 10, a sprocket 11 driven by the unit 10, a chain saw bar 12 secured to the unit, and a saw chain 13 driven by the sprocket 11. In the first embodiment of the invention, the bar 12 includes a center plate 15 and two side plates 16 which extend beyond the center plate to provide a groove 17. The bar 12 is provided with a nose roller 21 in the outer or nose portion of the bar 12 to guide the chain 13 around this portion of the bar.

The chain 12 is driven by the sprocket 11 in the groove 17 and includes aligned side links 22 which are articulately alternately connected to aligned connecting links 23 and cutter links 24 by pintles 25. The cutter links 24 are provided with downwardly extending portions 26 which are adapted to engage the sprocket 11 so that the sprocket 11 will drive the chain 13, and will engage the bottom of the groove 17 as the chain 13 passes therealong. An outer surface 18 of the center plate 15 may ordinarily define the bottom of the groove 17, however, in this embodiment of the invention, a wear strip 27 is provided along the edge surface 18 of the center plate 15 and is retained thereon by the dovetail projections 28 adjacent the end of the strips 27 to provide a special wear surface bottom for the groove 17.

The abrasive plates 30 are provided with tapered end surfaces 31 on faces 32 thereof which form a wide-mouthed groove 33 (FIGS. 3 and 4), for receiving the aligned center link projections 26 of the chain 13. Each of the plates 30 is provided with a longitudinal groove 34 (FIG. 3) adapted to receive the wear strip insert 27 and are each positioned on a recessed portion 35 of the insert 27. The plates 30 are positioned in the groove 17 and a recess 36 in the center plate 15. Further, the plates 30 are substantially symmetrical and extend vertically substantially an equal distance from the top and bottom of the insert 27 so that the insert may be removed, rotated 180° on the longitudinal axis thereof, and reinserted in this reversed position to provide a double wear structure for both the wear strips 27 and the plates 30.

It should be noted that the plates 30 are positioned on the wear strips 27 in the bottom of the groove 17 and recess 36 in a manner to receive the downwardly projecting portions 26 of the cutter links 24 as the chain 13 is moved in the groove 17. Thus, any burrs that are formed on the downwardly extending portions 26 of the cutter links 24 resulting from engagement thereof with the sprocket 11, the bottom or sides of the groove 17, or by any other means will be abrasively engaged by the facing surfaces 32 of the plates 30 to automatically resist the build-up of burrs on the downwardly projecting portions 26 during the operation of the saw chain.

The second embodiment of this invention is illustrated in FIGS. 5-8, wherein the reference numerals that are identical to the numerals utilized with reference to FIGS. 1-4, refer to identical structures. Wear strips 39 are provided in this embodiment of the invention which are retained on the surface 18 of the center plate 15 by the dovetail surfaces 28 at one end thereof, and by similar surfaces 40 of abrasive plates 41. The plates 41 are retained in position on the surface 18 of the center plate 15 by lanced extrusions 42.

The extrusions 42 are positioned inwardly over a surface 43 on the plates 41. The plates 41 are provided with longitudinal projections 44 which extend upwardly into the groove 17 with facing surfaces 45 to form an abrasive groove 46 for receiving the downwardly extended cutter link portions 26 as the chain 13 is driven along the groove 17 by the sprocket 11. The downwardly extended portions 26 of the cutter links 24 will thereby be abrasively engaged by the facing surfaces 45 of the plates 41 to automatically abrasively resist the build-up of burrs on the link portions 26 during the operation of the saw chain 13.

The third embodiment of this invention is illustrated in FIGS. 9-11, wherein the reference numerals that are identical to the numerals utilized with reference to FIGS. 1-4, refer to identical structures. The wear strips 27 utilized with the first embodiment of this invention are optional but are shown with this embodiment.

Abrasive plates 50 are provided on each side of the groove 17 in one or more positions therealong, and comprise generally, a longitudinal abrasive body portion 51 which has an offset and reduced end section 52. The end sections are mounted in apertures 53 in the side plates and are retained therein by lanced sections 54 of the side plates 16. Abrasive plates 50 are thus positioned by forming the lanced sections 54 at a greater angle than that shown (FIG. 11), placing the plates 50 on the inside of the groove 17 with the end sections 52 in the apertures 53, and then returning the lanced sections 54 from the greater lanced angle to the angle shown (FIG. 11).

The plates 50 are thereby each retained between the lancings 54 and the inner groove surface of the side plates 16. The plates 50 are provided with inner abrasive surfaces which will engage the downwardly extended portions 26 of the cutter links 24 as the chain 13 is driven along the groove 17, so that the portion 16 will thereby be abrasively engaged by the inner facing surfaces 55 of the plates 50 to automatically and abrasively resist the build-up of burrs on the portions 26 during the operation of the saw chain.

The fourth embodiment of this invention is illustrated in FIGS. 12-14, wherein the reference numerals that are identical to the numerals utilized with reference to FIGS. 1-4, refer to identical structures. The optional wear strips 27 utilized with the first embodiment of this invention are also employed in this embodiment.

Abrasive structures generally designated by the numeral 60 are provided in the inner surfaces of the side plates 16 in one or more positions along the groove 17. The structures 60 are provided with facing surfaces 61 which provide an abrasive groove 62 and are formed into the groove 17 from the side plates 16 by deforming the side plates 16 inwardly adjacent the top of the wear strips 27. The abrasive structures 60 could also be provided in the form of separate elongated plates which are welded or otherwise secured to the facing surfaces of the side plates 16 to form the facing surfaces 61 and the abrasive groove 62. In this embodiment, as in the others, the downwardly extending portions 26 of the cutter links 24 will be abrasively engaged in the abrasive groove 62 by the facing surfaces 61 thereof to automatically and abrasively resist the build-up of burrs on the link portions 26 during the operation of the saw chain 13.

The fifth embodiment of this invention is illustrated in FIGS. 15-17, wherein the reference numerals that are identical to the numerals utilized with reference to FIGS. 1-4, refer to identical structures. A combination wear strip and abrasive structure 65 are provided in this embodiment of the invention which is retained on the surface 18 of the center plate 15 by the dovetail surfaces 28 at the ends thereof.

The abrasive strips 65 are provided with a main body portion 66 and projecting plates 67 having inner surfaces 68 forming an abrasive groove 69. The plates 67 may be provided with an appropriate number of relieved portions 70 to provide a predetermined resiliency within the strip 65 as is desired under operating circumstances. The relieved portions 70 are not limited to the narrow groove, but may be an elongated recess such as 71 or other similar types of relief to provide the resiliency required. The downwardly extended portions 26 of the cutter links 24 will be abrasively engaged by the facing inner surfaces 68 of the plate portions 67 as the chain 13 is moved in the groove 17 to automatically and abrasively resist the build-up of burrs on the link portions 26 during the operation of the saw chain 13.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. A saw chain deburring structure comprising a chain saw bar having a groove in the periphery thereof for slidably receiving a saw chain, a saw chain adapted to be driven in the groove of said bar and having aligned links thereof extending further into said groove than the remaining links thereof, means for driving said chain in the bar groove, and an abrasive means secured to said bar and positioned in the groove thereof for engaging the sides of said projecting links as said chain is driven in the bar groove to deburr said projecting links.

2. A saw chain deburring structure as defined in claim 1 wherein the abrasive means comprises a wear strip secured to said bar in the bottom of the groove formed therein and having plates secured to two opposite sides in spaced-apart relation and extending laterally in the same direction beyond another lateral side of said strip to form a groove to abrasively receive the extending link portions.

3. A saw chain deburring structure as defined in claim 2 wherein the bar is provided with a recess that opens into the bottom of the bar groove and the abrasive plates extend laterally in two opposite directions beyond the other lateral surfaces of said strip with one lateral extension thereof positioned in the recess and the other extension positioned in the bar groove to form the abrasive groove.

4. A saw chain deburring structure as defined in claim 1 wherein said abrasive means has longitudinal projections which extend into the bar groove in laterally-spaced relation to form a groove for abrasively engaging the sides and bottom of the projecting link portions.

5. A saw chain deburring structure as defined in claim 1 wherein said abrasive means comprises a plate longitundinally positioned on the sides of the bar groove and having offset and laterally extended end portions positioned through the lateral apertures in the bar and retained by a lanced portion of said bar.

6. A saw chain deburring structure as defined in claim 1 wherein said abrasive means is a portion of said bar which extends into the groove thereof adjacent the bottom of the groove.

7. A saw chain deburring structure as defined in claim 1 wherein said abrasive means is a plate secured to said bar adjacent the bottom of the groove and on the side thereof.

8. A saw chain deburring structure as defined in claim 1 wherein said abrasive means is a wear strip secured to said bar in the bottom of the bar groove and having lateral projections extend laterally and outwardly of the groove along the sides thereof to form an abrasive groove therebetween for engaging the bottom and sides of said projecting links.

9. A saw chain deburring structure as defined in claim 8 wherein said outwardly extending lateral wear strip projections are provided with lateral relief slots to allow the strips to be more flexible.

References Cited

UNITED STATES PATENTS

| | | | |
|---|---|---|---|
| 1,642,145 | 9/1927 | Ferguson | 143—32 X |
| 2,109,702 | 3/1938 | Large | 143—32 |
| 2,851,834 | 9/1958 | Haneer | 51—250 |
| 3,191,646 | 6/1965 | Merz | 143—32 |

DONALD R. SCHRAN, *Primary Examiner.*